(12) United States Patent
Szczeszynski et al.

(10) Patent No.: US 10,162,376 B2
(45) Date of Patent: *Dec. 25, 2018

(54) CHARGE PUMP WITH TEMPORALLY-VARYING ADIABATICITY

(71) Applicant: pSemi Corporation, San Diego, CA (US)

(72) Inventors: Gregory Szczeszynski, Hollis, NH (US); Oscar Blyde, Melrose, MA (US)

(73) Assignee: pSemi Corporation, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/460,596

(22) Filed: Mar. 16, 2017

(65) Prior Publication Data

US 2017/0285679 A1    Oct. 5, 2017

Related U.S. Application Data

(63) Continuation of application No. 14/719,815, filed on May 22, 2015, now Pat. No. 9,658,635, which is a continuation of application No. 14/027,716, filed on Sep. 16, 2013, now Pat. No. 9,041,459.

(51) Int. Cl.
*G05F 1/10* (2006.01)
*G05F 3/02* (2006.01)
*H02M 3/07* (2006.01)

(52) U.S. Cl.
CPC ............. *G05F 3/02* (2013.01); *H02M 3/07* (2013.01)

(58) Field of Classification Search
CPC ........ H02M 3/07; G06F 3/0416; G06F 3/044; G11C 16/0433
See application file for complete search history.

(56) References Cited

U.S. PATENT DOCUMENTS

| 4,214,174 A | 7/1980 | Dickson |
| 4,812,961 A | 3/1989 | Essaff et al. |
| 5,132,606 A | 7/1992 | Herbert |
| 5,301,097 A | 4/1994 | McDaniel |
| 5,563,779 A | 10/1996 | Cave et al. |
| 5,737,201 A | 4/1998 | Meynard et al. |
| 5,761,058 A | 6/1998 | Kanda et al. |
| 5,801,987 A | 9/1998 | Dinh |

(Continued)

FOREIGN PATENT DOCUMENTS

| EP | 2469694 | 6/2012 |
| JP | 10327573 | 12/1998 |

(Continued)

OTHER PUBLICATIONS

Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.

(Continued)

*Primary Examiner* — Sibin Chen
(74) *Attorney, Agent, or Firm* — Occhiuti & Rohlicek LLP

(57) ABSTRACT

Operation of a charge pump is controlled to optimize power conversion efficiency by using an adiabatic mode with some operating characteristics and a non-adiabatic mode with other characteristics. The control is implemented by controlling a configurable circuit at the output of the charge pump.

24 Claims, 5 Drawing Sheets

(56) References Cited

U.S. PATENT DOCUMENTS

| | | |
|---|---|---|
| 5,907,484 A | 5/1999 | Kowshik et al. |
| 5,978,283 A | 11/1999 | Hsu et al. |
| 6,107,864 A | 8/2000 | Fukushima |
| 6,169,457 B1 | 1/2001 | Ichimaru |
| 6,476,666 B1 | 11/2002 | Palusa et al. |
| 6,486,728 B2 | 11/2002 | Kleveland |
| 6,501,325 B1 | 12/2002 | Meng |
| 6,504,422 B1 | 1/2003 | Rader et al. |
| 6,759,766 B2 | 7/2004 | Hiratsuka et al. |
| 6,927,441 B2 | 8/2005 | Pappalardo et al. |
| 6,980,181 B2 | 12/2005 | Sudo |
| 7,145,382 B2 | 12/2006 | Ker et al. |
| 7,190,210 B2 | 3/2007 | Azrai et al. |
| 7,224,062 B2 | 5/2007 | Hsu |
| 7,239,194 B2 | 7/2007 | Azrai et al. |
| 7,250,810 B1 | 7/2007 | Tsen |
| 7,408,330 B2 | 8/2008 | Zhao |
| 7,511,978 B2 | 3/2009 | Chen et al. |
| 7,595,682 B2 | 9/2009 | Lin et al. |
| 7,659,760 B2 | 2/2010 | Doi |
| 7,724,551 B2 | 5/2010 | Yanagida |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,812,579 B2 | 10/2010 | Williams |
| 7,928,705 B2 | 4/2011 | Hooijschuur et al. |
| 7,999,601 B2 | 8/2011 | Schlueter et al. |
| 8,018,216 B2 | 9/2011 | Kakehi |
| 8,035,148 B2 | 10/2011 | Goldstein |
| 8,040,174 B2 | 10/2011 | Likhterov |
| 8,048,766 B2 | 11/2011 | Joly et al. |
| 8,111,054 B2 | 2/2012 | Yen et al. |
| 8,159,091 B2 | 4/2012 | Yeates |
| 8,164,369 B2 * | 4/2012 | Raghunathan ........ H03L 7/0891 327/149 |
| 8,193,604 B2 | 6/2012 | Lin et al. |
| 8,212,541 B2 | 7/2012 | Perreault et al. |
| 8,339,184 B2 | 12/2012 | Kok et al. |
| 8,350,549 B2 | 1/2013 | Kitabatake |
| 8,384,467 B1 | 2/2013 | O'Keeffe et al. |
| 8,395,914 B2 | 3/2013 | Klootwijk et al. |
| 8,456,874 B2 | 6/2013 | Singer et al. |
| 8,503,203 B1 | 8/2013 | Szczeszynski et al. |
| 2003/0169096 A1 | 9/2003 | Hsu et al. |
| 2003/0227280 A1 | 12/2003 | Vinciarelli |
| 2004/0041620 A1 | 3/2004 | D'Angelo et al. |
| 2004/0080964 A1 | 4/2004 | Buchmann |
| 2005/0007184 A1 | 1/2005 | Kamijo |
| 2005/0068073 A1 * | 3/2005 | Shi ........................ H03L 7/0812 327/156 |
| 2005/0136873 A1 * | 6/2005 | Kim ...................... H03L 7/0891 455/260 |
| 2005/0207133 A1 | 9/2005 | Pavier et al. |
| 2007/0210774 A1 | 9/2007 | Kimura et al. |
| 2007/0230221 A1 | 10/2007 | Lim et al. |
| 2008/0150621 A1 | 6/2008 | Lesso et al. |
| 2008/0157732 A1 | 7/2008 | Williams |
| 2008/0157733 A1 | 7/2008 | Williams |
| 2008/0239772 A1 | 10/2008 | Oraw et al. |
| 2009/0102439 A1 | 4/2009 | Williams |
| 2009/0257211 A1 | 10/2009 | Kontani et al. |
| 2009/0278520 A1 | 11/2009 | Perreault et al. |
| 2010/0110741 A1 | 5/2010 | Lin et al. |
| 2010/0140736 A1 | 6/2010 | Lin et al. |
| 2010/0202161 A1 | 8/2010 | Sims et al. |
| 2010/0214746 A1 | 8/2010 | Lotfi et al. |
| 2010/0244189 A1 | 9/2010 | Klootwijk et al. |
| 2010/0244585 A1 | 9/2010 | Tan et al. |
| 2011/0050325 A1 * | 3/2011 | Schatzberger ........ H02M 3/073 327/536 |
| 2011/0062940 A1 | 3/2011 | Shvartsman |
| 2011/0163414 A1 | 7/2011 | Lin et al. |
| 2011/0273151 A1 | 11/2011 | Lesso et al. |
| 2011/0304310 A1 | 12/2011 | Sotono |
| 2012/0146177 A1 | 6/2012 | Choi et al. |
| 2012/0313602 A1 | 12/2012 | Perreault et al. |
| 2012/0326684 A1 | 12/2012 | Perreault et al. |
| 2013/0049714 A1 | 2/2013 | Chiu |
| 2013/0094157 A1 | 4/2013 | Giuliano |
| 2013/0154600 A1 | 6/2013 | Giuliano |
| 2013/0229841 A1 | 9/2013 | Giuliano |
| 2013/0287231 A1 | 10/2013 | Kropfitsch |

FOREIGN PATENT DOCUMENTS

| | | |
|---|---|---|
| JP | 11235053 | 8/1999 |
| JP | 2010045943 A | 2/2010 |
| WO | 2006093600 | 9/2006 |
| WO | 2009112900 | 9/2009 |
| WO | 2012151466 | 11/2012 |
| WO | 2013059446 | 4/2013 |
| WO | 2013096416 | 6/2013 |

OTHER PUBLICATIONS

Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.

Axelrod et al. "Single-switch single-stage switched-capacitor buck converter", *Proc. of NORPIE 2004, 4th Nordic Workshop on Power and Industrial Electronics*, Jun. 2004.

Sun et al. "High Power Density, High Efficiency System Two-Stage Power Architecture for Laptop Computers", *Power Electronics Specialists Conference*, pp. 1-7, Jun. 2006.

Middlebrook, "Transformerless DC-to-DC Converters with Large Conversion Ratios" *IEEE Transactions on Power Electronics*, vol. 3, No. 4, pp. 484-488, Oct. 1988.

Wood et al, "Design, Fabrication and Initial Results of a 2g Autonomous Glider" *IEEE Industrial Electronics Society*, pp. 1870-1877, Nov. 2005.

Meynard, H. Foch, "Multi-Level Conversion: High Voltage Choppers and Voltage-Source Inverters," *IEEE Power Electronics Specialists Conference*, pp. 397-403, 1992.

Pilawa-Podgurski et al. "Merged Two-Stage Power Converter Architecture with Soft Charging Switched-Capacitor Energy Transfer" *39th IEEE Power Electronics Specialists Conference*, 2008.

Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.

Lei et al. "Analysis of Switched-capacitor DC-DC Converters in Soft-charging Operation" *14th IEEE Workshop on Control and Modeling for Power Electronics*, pp. 1-7, Jun. 23, 2013.

Ng et al. "Switched Capacitor DC-DC Converter: Superior where the Buck Converter has Dominated" *PhD Thesis, UC Berkeley*, Aug. 17, 2011.

R. Pilawa-Podgurski and D. Perreault, "Merged Two-Stage Power Converter with Soft Charging Switched-Capacitor Stage in 180 nm CMOS," *IEEE Journal of Solid-State Circuits*, vol. 47, No. 7, pp. 1557-1567, Jul. 2012.

* cited by examiner

CHARGE PUMP WITH TEMPORALLY-VARYING ADIABATICITY

CROSS REFERENCE TO RELATED APPLICATIONS

This application is a continuation of U.S. application Ser. No. 14/719,815, filed on May 22, 2015, which claims the benefit of the priority date of U.S. application Ser. No. 14/027,716, filed on Sep. 16, 2013, issued as U.S. Pat. No. 9,041,459 on May 26, 2015, the contents of which are hereby incorporated by reference in their entirety

BACKGROUND

This invention relates to adiabatic power conversion, and in particular to configuration and control for partial adiabatic operation of a charge pump.

Various configurations of charge pumps, including Series-Parallel and Dickson configurations, rely on alternating configurations of switch elements to propagate charge and transfer energy between the terminals of the charge pump. Energy losses associated with charge propagation determine the efficiency of the converter.

Referring to FIG. 1, a single-phase Dickson charge pump 100 is illustrated in a step-down mode coupled to a low-voltage load 110 and a high-voltage source 190. In the illustrated configuration, generally the low-voltage load 110 is driven (on average) by a voltage that is ⅕ times the voltage provided by the source and a current that is five times the current provided by the high-voltage source 190. The pump is driven in alternating states, referred to as state one and state two, such that the switches illustrated in FIG. 1 are closed in the indicated states. In general, the duration of each state is half of a cycle time T and the corresponding switching frequency of the charge pump 100 is equal to the inverse of the cycle time T.

FIGS. 2A-B illustrate the equivalent circuit in each of states two and state one, respectively, illustrating each closed switch as an equivalent resistance R. Capacitors C1 through C4 have a capacitance C. In a first conventional operation of the charge pump 100, the high-voltage source 190 is a voltage source, for example, a twenty-five volt source, such that the low-voltage load 100 is driven by five volts. In operation, the voltage across the capacitors C1 through C4 are approximately five volts, ten volts, fifteen volts, and twenty volts, respectively.

One cause of energy loss in the charge pump 100 relates the resistive losses through the switches (i.e., through the resistors R in FIGS. 2A-B). Referring to FIG. 2A, during state two, charge transfers from the capacitor C2 to the capacitor C1 and from the capacitor C4 to the capacitor C1. The voltages on these pairs of capacitors equilibrate assuming that the cycle time T is sufficiently greater than the time constant of the circuit (e.g., that the resistances R are sufficiently small. Generally, the resistive energy losses in this equilibration are proportional to the time average of the square of the current passing between the capacitors and therefore passing to the low-voltage load 110. Similarly, during state one, the capacitors C3 and C2 equilibrate, the capacitor C4 charges, and the capacitor C1 discharges, also generally resulting in a resistive energy loss that is proportional to the time average of the square of the current passing to the low-voltage load 110.

For a particular average current passing to the load 110, assuming that the load presents an approximately constant voltage, it can be shown than the resistive energy loss decreases as the cycle time T is reduced (i.e., switching frequency is increased). This can generally be understood by considering the impact of dividing the cycle time by one-half, which generally reduces the peak currents in the equilibration by one half, and thereby approximately reduces the resistive energy loss to one quarter. So the resistive energy loss is approximately inversely proportional to the square of the switching frequency.

However, another source of energy loss relates to capacitive losses in the switches, such that energy loss grows with the switching frequency. Generally, a fixed amount of charge is lost with each cycle transition, which can be considered to form a current that is proportional to the switching frequency. So this capacitive energy loss is approximately proportional to the square of the switching frequency.

Therefore, with a voltage source and load there an optimal switching frequency that minimizes the sum of the resistive and capacitive energy losses, respectively reduced with increased frequency and increased with increased frequency.

SUMMARY

Patent Publication WO 2012/151466, published on Nov. 8, 2012, describes configurations in which the source and/or load comprise regulating circuits. In particular, in FIGS. 1 and 2A-B, the load 110 can effectively comprise a current sink rather than present a constant voltage in an example of what is referred to as "adiabatic" operation of a charge pump. If the current sink accepts constant current, then the currents illustrated in FIG. 2A effectively remain substantially constant values during the illustrated state. Therefore, the resistive power loss is lower than the resistive loss in the voltage driven case discussed in the Background, and also substantially independent of the cycle time T. In situations in which the load sinks a pulsed current, then for a particular average current, the resistive energy loss generally increases as the duty cycle of the current decreases (and the peak current increases). There is a range of low duty cycles in which the resistive losses with a pulsed current exceed the losses for the same average current that would result from the charge pump driving a relatively constant output voltage, for example, across a large output capacitor.

In one aspect, in general, operation of a charge pump is controlled to optimize power conversion efficiency by using an adiabatic mode with some operating characteristics and a non-adiabatic mode with other characteristics. The control is implemented by controlling a configurable circuit at the output of the charge pump.

In another aspect, in general, operation of a charge pump is controlled so that resistive power losses are minimized by using an adiabatic mode with relatively high duty cycle (i.e., relatively high output current) and using a non-adiabatic mode with relative low duty cycle (e.g., relatively low output current). In some examples, mode is selected by selectively introducing a compensation capacitor at the output of the charge pump to present a substantially constant voltage.

In another aspect, in general, an apparatus a charge pump and a controller coupled to the charge pump. The charge pump has a plurality of switch elements arranged to operate in a plurality cycles, with each cycle being associated with a different configuration of the switch elements. The switch elements are configured to provide charging and discharging paths for a plurality of capacitive elements. The controller has an output for controlling timing of the cycles of the charge pump and one or more sensor inputs for accepting sensor signals charactering operation of the charge pump and/or operation of peripheral circuits coupled to the charge pump. The controller is configured adjust the timing of the cycles of the charge pump according variation of the one or more sensor inputs within cycles of operation of the charge pump.

In another aspect, in general, an apparatus includes a switched capacitor charge pump configured to provide a voltage conversion between terminals including a high voltage terminal and a low voltage terminal. The apparatus also includes a compensation circuit coupled to a first terminal of the charge pump for driving a load by the charge pump, the compensation circuit providing a capacitance configurably couplable to the first terminal of the charge pump. A controller is coupled to charge pump and the configurable circuit, and has an output for configuring the compensation circuit, and one or more sensor inputs for accepting sensor signals charactering operation of the charge pump and/or operation of peripheral circuits coupled to the charge pump. The controller is configured to configure the compensation circuit according to the sensor signals to affect efficiency of power conversion between a power source coupled to the charge pump and the load coupled to the charge pump via the configurable circuit.

Aspects may include one or more of the following features.

The controller is configured to couple a selected capacitance to the first terminal to optimize an efficiency of the power conversion.

The one or more sensor signals include a sensor signal that characterizes time variation of a current passing to or from the charge pump via the compensation circuit. In some examples, the sensor signal characterizes a duty cycle of a pulsed current passing to or from the charge pump. In some examples, this current passing to or from the charge pump via the compensation circuit is a current passing between the compensation circuit and a peripheral coupled to the charge pump via the compensation circuit.

The one or more sensor signals include a sensor signal that characterizes a voltage at at least one of the terminals of the charge pump and at the peripheral circuit coupled to the charge pump.

The one or more sensor signals include a sensor signal that characterizes switching frequency of the charge pump.

The controller is configured to determine an operating mode from the sensor signals, and to determine the configuration of the compensation circuit according to the determined mode.

The controller is configured to identify at least a mode having fast switching limit operation of the charge pump and a pulsed current load, and increase the capacitance coupled to the first terminal in said mode.

The controller is configured to identify at least a mode having slow switching limit operation of the charge pump and a pulsed current load with a duty cycle less than a threshold duty cycle, and increase the capacitance coupled to the first terminal in said mode.

The apparatus further includes a peripheral circuit that includes a regulator coupled to the compensation circuit. The regulator provides a current-based load via the compensation circuit to charge pump. The controller is configured to determining a configuration of the compensation circuit according to an efficiency of power conversion performed by the charge pump. In some examples, the regulator comprises a Buck converter. In some examples, the charge pump comprises a Series-Parallel charge pump. In some examples, the charge pump comprises a Dickson charge pump.

In another aspect, in general, a method is directed to power regulation using a charge pump coupled to a load using a compensation circuit coupled to a terminal of the charge pump. The method includes configuring a capacitance provided by the compensation circuit to a first terminal of the charge pump. The capacitance is selected according to the sensor signals to affect efficiency of power conversion between a power source coupled to the charge pump and the load coupled to the charge pump via the configurable circuit.

The method may include acquiring the sensor signals. The sensor signals may characterize one or more a time variation of a current passing to or from the charge pump via the compensation circuit, a duty cycle of a current passing between the compensation circuit and a peripheral circuit, a voltage at the first terminal of the charge pump, and a voltage at the peripheral circuit coupled to the charge pump.

One advantage of one or more embodiments is that efficient operation is maintained in varying operating modes of the power converter.

Another advantage of one or more embodiments is that a controller does not have to be preconfigured for a particular use of a charge pump and can adapt to the circuit in which the pump is embedded without further configuration. For example, the controller can adapt to the size of pump capacitors used, type of regulator coupled to the pump, switching frequency of the pump and/or regulator, etc.

Other features and advantages of the invention are apparent from the following description, and from the claims.

DESCRIPTION

Figure 1:
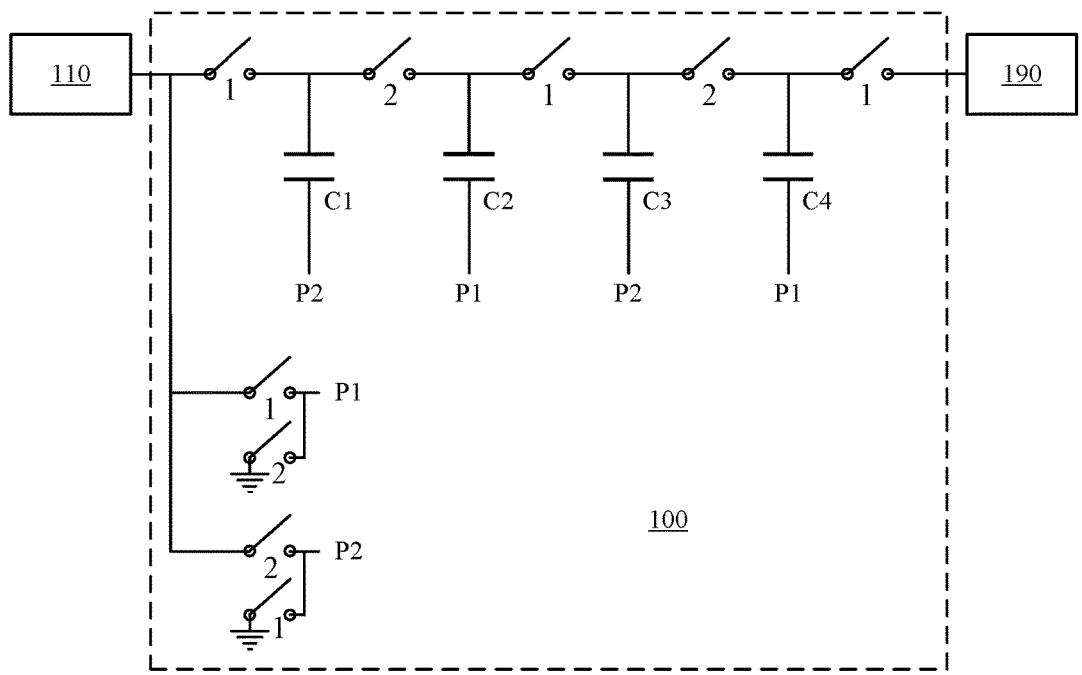
FIG. 1 is a single-phase 1:5 Dickson charge pump.
Figure 2A:
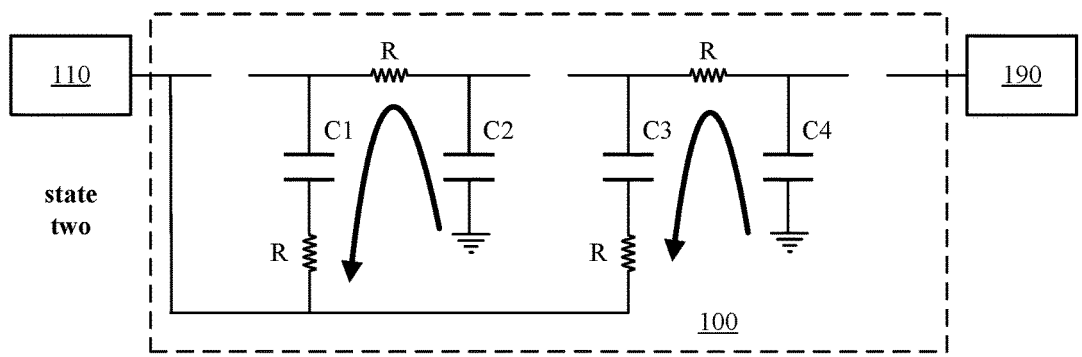
FIGS. 2A-B are equivalent circuits of the charge pump of FIG. 1 in two states of operation.
Figure 2B:
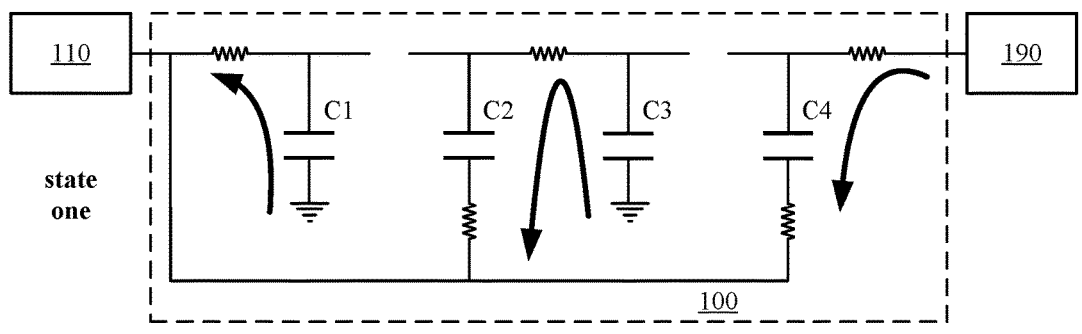

As introduced above, as one example, a charge pump 100 illustrated in FIG. 1 may be operated in an "adiabatic" mode in which one or both of a low-voltage peripheral 110 and a high-voltage peripheral 190 may comprise a current source. For example, Patent Publication WO 2012/151466, published on Nov. 8, 2012, and incorporated herein by reference, describes configurations in which the source and/or load comprise regulating circuits. In particular, in FIGS. 1 and 2A-B, the low-voltage load 110 can effectively comprise a current source rather than a voltage source in an example of what is referred to as "adiabatic" operation of a charge pump. If the current source maintains a constant current from the charge pump, then currents illustrated in FIG. 2A maintain substantially constant values during the illustrated state. Therefore, the resistive losses in the switches through which the current passes are lower than the resistive loss in the voltage load case, and also substantially independent of the switching frequency and the cycle time T. As in the voltage driven case, there capacitive losses in the switches grow with increasing switching frequency, which suggests that lowering the switching frequency is desirable. However, other factors, which may depend on internal aspects of the charge pump, voltage or current characteristics at the terminals of the charge pump, and/or internal aspects of the peripheral elements, such as the source and/or load, may limit the cycle time (e.g., impose a lower limit on the switching frequency).

Figure 3:
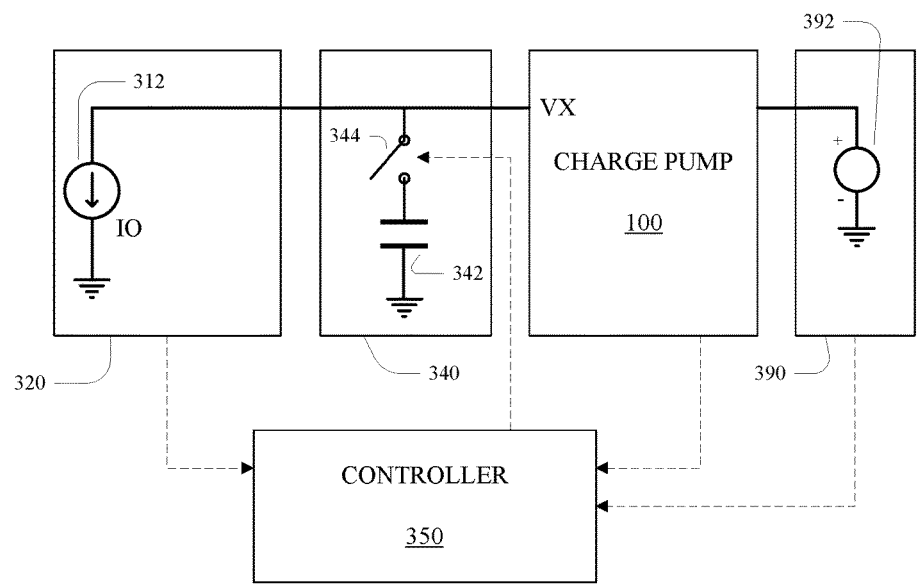
FIGS. 3 and 4 are circuits having a switchable compensating circuit coupled to the charge pump.

Referring to FIG. 3, in a first mode of operation, a load 320 can be considered to comprise a constant current source 312 with an output current IO. In some implementations, the load 320 also includes an output capacitor, which for the analysis below can be considered to be small enough such that current passing to the load 320 can be considered to be substantially constant. As introduced above with reference to FIGS. 2A-B, the charge transfer between capacitors in the charge pump 100 during the alternating states of operation of the charge pump 100 are therefore substantially constant in the adiabatic mode of operation.

Continuing to refer to FIG. 3, a compensation circuit 340 is introduced between the charge pump 100 and the load 320. A switch 344 is controllable to selectively introduce a compensation capacitor 342 to the output of the charge pump 100.

Various factors can affect the efficiency of the power conversion illustrated in FIG. 3, including the voltage of an input voltage source 392, the switching frequency of the charge pump 100, and the output current 10 (or somewhat equivalently the input or output current of the charge pump 100). The efficiency is also dependent on whether or not the compensation capacitor 342 is coupled to the output path via the switch 344. As a general approach, a controller 350 accepts inputs that characterize one or more factors that affect efficiency and outputs a control signal that sets the state of the switch 344 according to whether efficiency is expected to be improved introducing the compensation capacitor versus not. A further discussion of logic implemented by the controller 350 is provided later in this Description.

Figure 4:
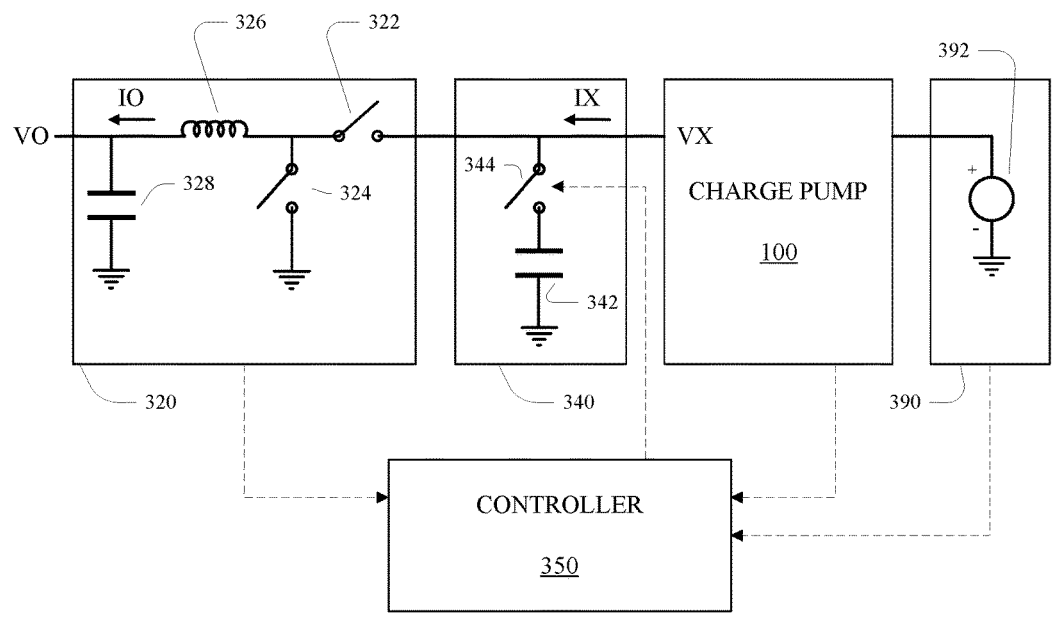

Referring to FIG. 4, in another example, a configuration of a charge pump 100 has a regulator 320 coupled via a compensation circuit 340 to the low-voltage terminal of a charge pump 100, and a voltage source 392 coupled to the high-voltage terminal of the charge pump 100. The regulator 320 (also referred to below generally interchangeably as a "converter") illustrated in FIG. 4 is a Buck converter, which consists of switches 322, 324, an inductor 326, and an output capacitor 328. The switches open and close (i.e., present high and low impedance, respectively) in alternating states, such that the switch 322 is open when then the switch 324 is closed, and the switch 322 is closed when the switch 324 is open. These switches operate at a frequency than can be lower, higher, or equal to the switches in the charge pump 100, with a duty cycle defined as the fraction of time that the switch 322 in the regulator 320 is closed. A preferred embodiment is when the switching frequency of the charge pump 100 is lower than the regulator 320. However, in the case the charge pump 100 is at a higher frequency than the regulator 320, the charge-pump 100 is disabled when the regulator 320 is off (low duty cycle) and the charge-pump 100 is enabled when the regulator 320 is on.

In general, the regulator 320 operates at its highest power efficiency when it operates at its highest duty cycle. In some examples, a controller of the regulator (not shown) adjusts the duty cycle in a conventional manner to achieve a desired output voltage VO. During the cycles of the regulator 320 in which the switch 322 is closed, the current passing from the charge pump 100 to the regulator 320 is effectively constant, equal to the current through the inductor 326. Assuming that the switching frequency of the regulator 320 is substantially higher than the switching frequency of the charge pump 100, the charge pump 100 can be considered to be driven by a pulsed current source with an average current equal to the duty cycle times the inductor current.

Note that as introduced above, in situations in which the regulator 320 sinks a pulsed current, then for a particular average current, the resistive energy loss generally increases as the duty cycle of the current decreases, approximately inversely with the duty cycle. There is a range of low duty cycles, and thereby high peak current relative to the average current, in which the resistive losses with a pulsed current exceed the losses for the same average current that would result from the charge pump 100 driving a relatively constant output voltage, for example, across a large output capacitor. Therefore, for a selected range of low duty cycles, the controller 350 closes the switch 344 and introduces a relatively large compensation capacitor 342 at the output of the charge pump 100. The result is that the charge pump 100 is presented with a substantially constant voltage, and therefore operates in a substantially "non-adiabatic" mode. Therefore, the controller 350 is effectively responsive to the output voltage because the duty cycle is approximately proportional to the output voltage. Thereby operating the charge pump 100 in an adiabatic mode at high output voltage and in a non-adiabatic mode at low output voltage; and switches between the adiabatic and non-adiabatic modes at a threshold duty cycle to maintain an optimum efficiency of the overall power conversion.

Figure 5:
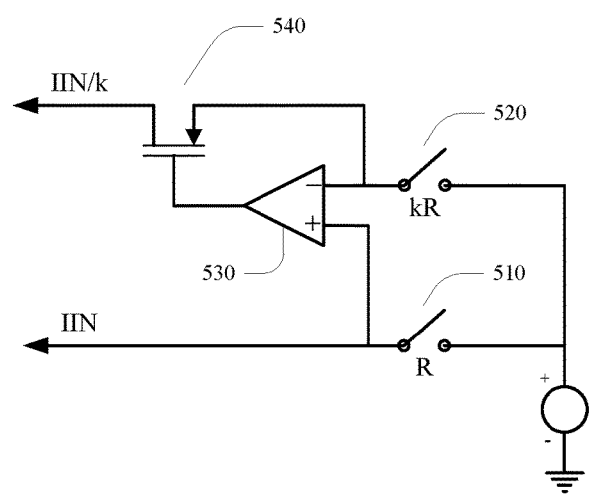
FIG. 5 is a circuit for measuring a charge pump current.

Examples of control logic implemented in the controller 350 in configurations such as those illustrated in FIGS. 4 and 5 can be under in view of the following discussion.

In general, a charge pump can operate in one of two unique operating conditions, or in the region in between them. In a slow switching limit (SSL) regime the capacitor currents in the charge pump have the time to settle to their final values and capacitor voltages experience significant change in magnitude from beginning to end of a cycle of the charge pump operation. In the fast switching limit (FSL) regime, the capacitors do not reach equilibrium during a cycle of the charge pump operation, for instance, due to a combination of one or more of high capacitances, high switching frequency, and high switch resistances.

Another factor relates to the capacitance at the output of the charge pump 100, which in the circuits of FIG. 4 can be increased by closing the switch 344 to add the compensation capacitor 342 to the output. For small output capacitance, the output current of the charge pump 100 is effectively set by the pulsed current characteristic of the regulator 320. As discussed above, for a given average current, the resistive power losses in the pulsed current case are approximately inversely proportional the duty cycle.

For large output capacitance, the RMS of the output current of the charge pump 100 is effectively determined by the equilibration of the internal capacitors of the charge pump 100 with the compensation capacitor 342 and the regulator 320. For a given average current, this resistive power loss is approximately inversely proportional to the square of the peak-to-peak voltage across the internal capacitors in the charge pump 100.

Four combinations of FSL/SSL and constant/pulsed IO modes of operation are possible. In some examples, each of these four modes is affected in different ways based on the addition of a compensation capacitor 342 as shown in FIGS. 3 and 4.

Case one: In FSL mode, with constant output current IO as in FIG. 3, introduction of the compensation capacitor 342 does not substantially affect conversion efficiency.

Case two: In FSL mode with pulsed output current as in FIG. 4, efficiency increases when the compensation capacitor 342 is introduced, thereby reducing the RMS current seen by the charge pump 100.

Case three: In SSL mode, with constant output current IO as in FIG. 3, efficiency generally increases without introduction of the compensation capacitor 342, thereby yielding adiabatic operation.

Case four: In SSL mode, with pulsed load current as in FIG. 4, efficiency depends on the relation between the average output current, the duty cycle, and how far the charge pump 100 is operating from the SSL/FSL boundary. For example, at low duty cycle, efficiency generally increases with introduction of the compensation capacitor 342, thereby yielding non-adiabatic operation. In contrast, at high duty cycle, efficiency generally increases without introduction of the compensation capacitor 342, thereby yielding adiabatic operation. Furthermore, when the charge pump 100 is in SSL mode, the farther from the SSL/FSL boundary, the lower the duty cycle at which the efficiency trend reverses.

Depending on the relative values of charge pump capacitors, switch resistances and frequency, it is possible that the charge pump operate in a regime between FSL and SSL. In this case, there is effectively a transition point between case four and case two at which the compensation capacitor is introduced according to the overall efficiency of the conversion. As described above, knowledge of the average charging current and its duty cycle is necessary in case four for determining if introduction of the compensation capacitor will improve efficiency.

In some implementations, the controller 350 does not have access to signals or data that directly provide the mode in which the power conversion is operating. One approach is for the controller to receive a sensor signal that represents the input current of the charge pump, and infer the operating mode from that sensor signal.

As an example, a sensor signal determined as a voltage across the switch at the high voltage terminal of the converter (e.g., the switch between source 109 and the capacitor C4 in FIG. 1) can be used to represent the current because when the switch is closed, the voltage is the current times the switch resistance.

An alternative circuit shown in FIG. 5 provides a scaled version of the input current IIN. The input switch 510, with closed resistance R is put in parallel with a second switch with closed resistance kR, for example, fabricated as a CMOS switch where the factor k depends on the geometry of the switch. When the switches are closed the differential amplifier 530 controls the gate voltage of a transistor 540 such that the voltage drop across the two switches are equal, thereby yielding the scaled input current IIN/k, which can be used to form a sensor input signal for the controller.

The sensed input current can be used to determine whether the compensation capacitor should be switched in, for example, according to a transition between case four and case two described above.

One possible method for determining the operation mode of the charge pump 100 consists of taking two or more measurements of the input current IIN and establishing that the difference between the values of consecutive samples is substantially zero for SSL mode, or is above a pre-determined threshold for FSL mode.

Another method is to measure the difference in the voltage of a capacitor in the charge pump 100. Once the input current IIN is known, the controller 350 can infer the operating mode based upon the voltage ripple on the capacitor over a full cycle. Note that the controller 350 does not necessarily know the particular sizes of capacitors that are used in the charge pump 100, for example, because the capacitors are discrete capacitors that are not predetermined. However, the capacitor values can be inferred from knowledge of the current, voltage ripple, and frequency, thereby allowing the controller 350 to determine whether the charge pump 100 is operating in the FSL or SSL mode. The controller 350 can then select adiabatic or non-adiabatic charging by controlling the switch 344 to selectively introduce the compensation capacitor 342.

Other controller logic is used in other implementations. For example, an alternative is for the controller to measure efficiency given by:

$$\eta = VO/(N*VIN)$$

where $\eta$ is the efficiency, VO is the measured converter output voltage, VIN is the measured converter input voltage, and N is the charge pump conversion ratio.

The controller directly measures the effect of selecting adiabatic vs. non-adiabatic charging on converter efficiency by comparing the average value of the output voltage VO over a complete charge pump cycle.

Other controller logic uses combinations of the approaches described above. For instance, the controller can confirm that the assessment of charge pump operating mode and estimation of efficiency increase by changing the charge pump charging mode.

Figure 6:
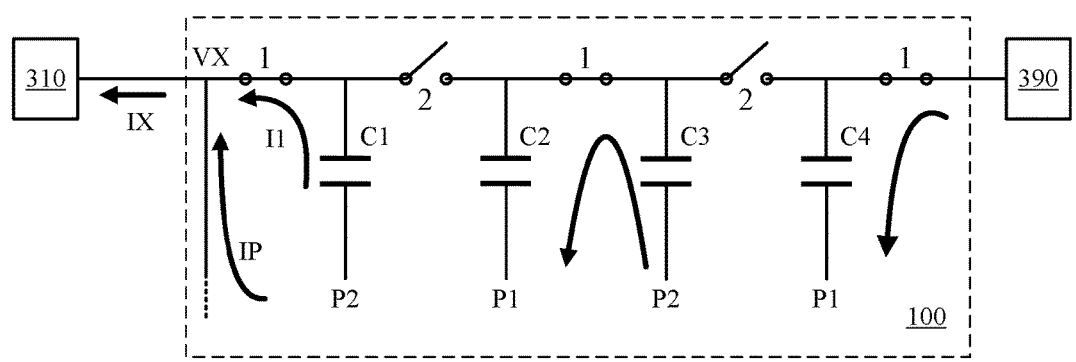
FIG. 6 is a schematic illustrating charge transfer during one cycle of the charge pump illustrated in FIG. 4.

A traditional method for operating the charge pump 100 is at a fixed frequency in which the switching occurs independently of the load requirement (i.e., the switches in FIG. 1 operate on a fixed time period). Referring to FIG. 6, during one cycle of the switching of the charge pump 100, a current I1 discharges from the capacitor C1 and a current IP discharges other of the capacitors in the charge pump 100. For a particular intermediate current IX, the longer the cycle time T, the larger the drop in voltage provided by the capacitor C1. A consequence of this is that the switching frequency generally limits the maximum intermediate current IX because the switching frequency for a particular load determines the extent of voltage excursions, and in some cases current excursions (i.e., deviations, variation), at various points and between various points within the charge pump 100 and at its terminals. For a particular design of charge pump 100, or characteristics of load and/or source of the charge pump 100, there are operational limits on the excursions.

Figure 7A:
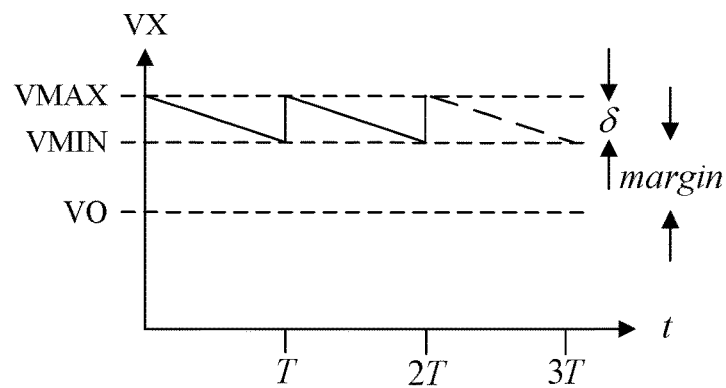
FIGS. 7A-C are graphs of output voltage of the charge pump illustrated in FIG. 4 at different output current and switching frequency conditions.
Figure 7B:
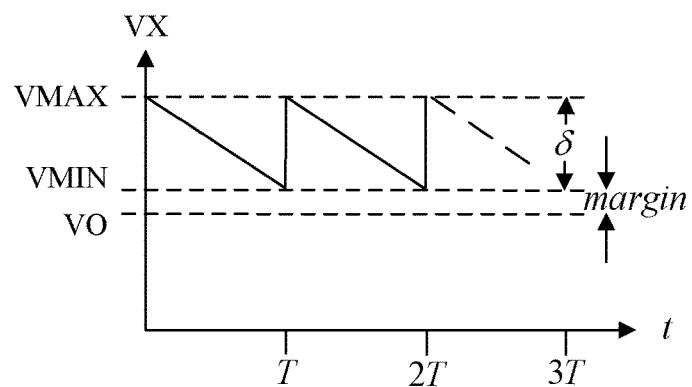
Figure 7C:
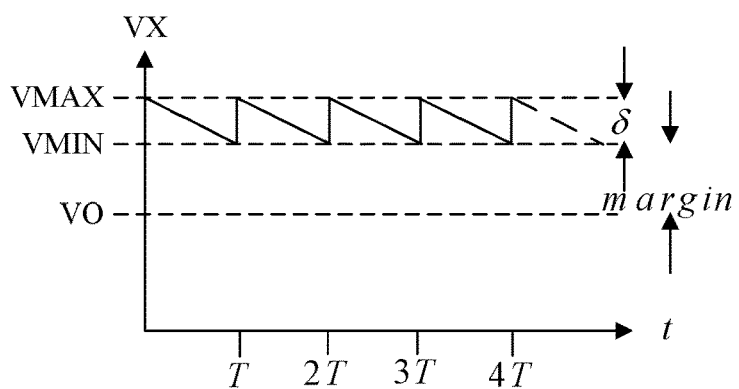
Figure 8:
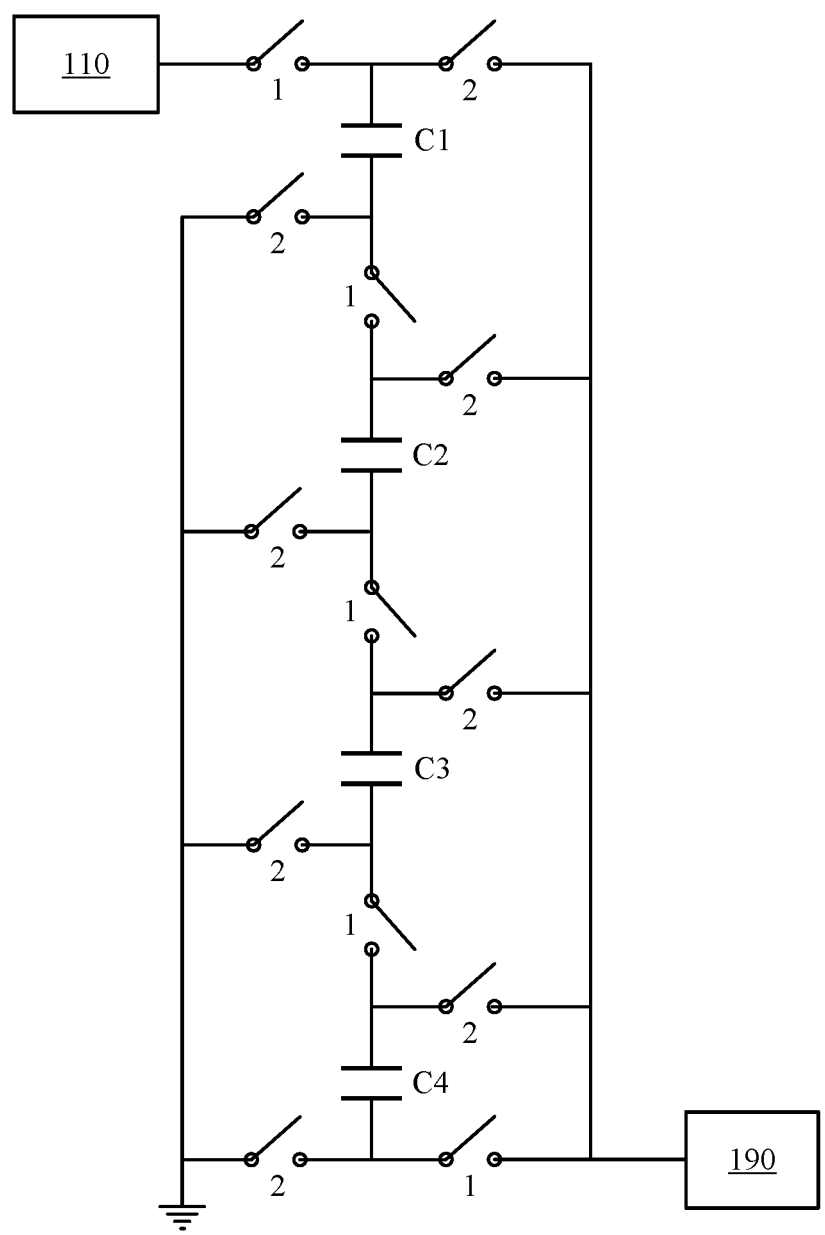
FIG. 8 is a single-phase series-parallel charge pump.

Referring to FIGS. 7A-C, the intermediate voltage VX of the charge pump 100 is shown in various current and timing examples. Referring to FIG. 7A, at a particular intermediate current IX, the intermediate voltage VX generally follows a saw-tooth pattern such that it increases rapidly at the start of each state, and then generally falls at a constant rate. Consequently, the rate of voltage drop depends on the output current IO. At a particular output current IO and switching time, a total ripple voltage δ results, and a margin over the output voltage VO is maintained, as illustrated in FIG. 7A. (Note that the graphs shown in FIGS. 7A-B do not necessarily show certain features, including certain transients at the state transition times, and related to the high frequency switching of the regulator 320; however these approximations are sufficient for the discussion below).

Referring to FIG. 7B, in the output current IO in the circuit in FIG. 4 increases, for instance by approximately a factor of two, the ripple of the intermediate voltage VX increases, and the minimum intermediate voltage VMIN decreases and therefore for a constant output voltage VO the margin (i.e. across inductor 316) in the regulator 320 decreases. However, if the voltage margin decreases below a threshold (greater than zero), the operation of the regulator 320 is impeded.

Referring to FIG. 7C, to provide the regulator 320 with a sufficient voltage margin voltage the switching frequency can be increases (and cycle time decreased), for example, to restore the margin shown in FIG. 7A. Generally, in this example, doubling the switching frequency compensates for the doubling of the output current IO. However more generally, such direct relationships between output current IO or other sensed signals and switching frequency are not necessary.

In general, a number of embodiments adapt the switching frequency of the charge pump 100 or determine the specific switching time instants based on measurements within the charge pump 100 and optionally in the low-voltage and/or high-voltage peripherals coupled to the terminals of the charge pump 100.

In a feedback arrangement shown in FIG. 4, the controller 350 adapts (e.g., in a closed loop or open loop arrangement) the switching frequency. For any current up to a maximum rated current with a fixed switching frequency, the charge pump 100 generally operates at a switching frequency lower than (i.e., switching times greater than) a particular minimum frequency determined by that maximum rated current. Therefore, when the current is below the maximum, capacitive losses may be reduced as compared to operating the charge pump 100 at the minimum switching frequency determined by the maximum rated current.

One approach to implementing this feedback operation is to monitor the intermediate voltage VX and adapt operation of the charge pump to maintain VMIN above a fixed minimum threshold. One way to adapt the operation of the charge pump 100 is to adapt a frequency for the switching of the charge pump 100 in a feedback configuration such that as the minimum intermediate voltage VMIN approaches the threshold, the switching frequency is increased, and as it rises above the threshold the switching frequency is reduced. One way to set the fixed minimum threshold voltage is as the maximum (e.g., rated) output voltage VO of the regulator 320, plus a minimum desired margin above that voltage. As introduced above, the minimum margin (greater than zero) is required to allow a sufficient voltage differential (VX–VO) to charge (i.e., increase its current and thereby store energy in) the inductor 326 at a reasonable rate. The minimum margin is also related to a guarantee on a maximum duty cycle of the regulator 320.

A second approach adapts to the desired output voltage VO of the regulator 320. For example, the regulator 320 may have a maximum output voltage VO rating equal to 3.3 volts. With a desired minimum margin of 0.7 volts, the switching of the charge pump 100 would be controlled to keep the intermediate voltage VX above 4.0 volts. However, if the converter is actually being operated with an output voltage VO of 1.2volts, then the switching frequency of the charge pump 100 can be reduced to the point that the intermediate voltage VX falls as low as 1.9 volts and still maintain the desired margin of 0.7 volts.

In a variant of the second approach, rather than monitoring the actual output voltage VO, an average of the voltage between the switches 312, 314 may be used as an estimate of the output voltage VO.

In yet another variant, the switching frequency of the charge pump 100 is adapted to maintain the intermediate voltage VX below a threshold value. For example, the threshold can be set such that the intermediate voltage VX lowers or rises a specific percentage below or above the average of the intermediate voltage VX (e.g. 10%). This threshold would track the intermediate voltage VX. Similarly, a ripple relative to an absolute ripple voltage (e.g. 100 mV) can be used to determine the switching frequency.

Note also that the voltage ripple on the output voltage VO depends (not necessarily linearly) on the voltage ripple on the intermediate voltage VX, and in some examples the switching frequency of the charge pump 100 is increased to reduced the ripple on the output voltage VO to a desired value.

Other examples measure variation in internal voltages in the charge pump 100, for example, measuring the ripple (e.g., absolute or relative to the maximum or average) across any of the capacitors C1 through C4. Such ripple values can be used instead of using the ripple on the intermediate voltage VX in controlling the switching frequency of the charge pump 100. Other internal voltages and/or currents can be used, for example, voltages across switches or other circuit elements (e.g., transistor switches), and the switching frequency can be adjusted to avoid exceeding rated voltages across the circuit elements.

In addition to the desired and/or actual output voltages or currents of the regulator 320 being provided as a control input to the controller 350, which adapts the switching frequency of the charge pump 100, other control inputs can also be used. One such alternative is to measure the duty cycle of the regulator 320. Note that variation in the intermediate voltage VX affects variation in current in the Buck converter's inductor 326. For example, the average of the intermediate voltage VX is generally reduced downward with reducing of the switching frequency of the charge pump 100. With the reduction of the average output voltage VO, the duty cycle of the regulator 320 generally increases to maintain the desired output voltage VO. Increasing the duty cycle generally increases the efficiency of a Buck converter. So reducing the switching frequency of the charge pump 100 can increase the efficiency of the regulator 320.

It should be understood that although the various signals used to control the switching frequency may be described above separately, the switch frequency can be controlled according to a combination of multiple of the signals (e.g., a linear combination, nonlinear combination using maximum and minimum functions, etc.). In some examples, an approximation of an efficiency of the charge pump is optimized.

The discussion above focuses on using the controller 350 to adjust the switching frequency of the charge pump 100 in relatively slow scale feedback arrangement. The various signals described above as inputs to the controller 350 can be used on an asynchronous operating mode in which the times at which the charge pump 100 switches between cycles is determined according to the measurements. As one example, during state one as illustrated in FIG. 6, the intermediate voltage VX falls, and when VX–VO reaches a threshold value (e.g., 0.7 volts), the switches in the charge pump 100 are switched together from state one to state two. Upon the transition to state two, the intermediate voltage VX rises and then again begins to fall, and when VX–VO again reaches the threshold value, the switches in the charge pump 100 are switched together from state two back to state one.

In some examples, a combination of asynchronous switching as well as limits or control on average switching frequency for the charge pump are used.

Unfortunately, as the intermediate current IX decreases the switching frequency of the charge pump 100 decreases as well. This can be problematic at low currents because the frequency could drop below 20 kHz, which is the audible limit for human hearing. Therefore, once the frequency has dropped below a certain limit, a switch 344 closes and introduces a compensation capacitor 342. This forces the converter into non-adiabatic operation allowing the frequency to be fixed to a lower bound (e.g. 20 kHz). Consequently, the compensation capacitor 342 is introduced when either the duty cycle is low or when the output current IO is low.

Note that the examples above concentrate on a compensation circuit that permits selectively switching a compensation capacitor of a certain fixed capacitance onto the output of the charge pump. More generally, a wide variety of compensation circuits can be controlled. One example is a variable capacitor, which can be implemented as a switched capacitor bank, for example, with power of two capacitances. The optimal choice of capacitance generally depends on the combination of operating conditions (e.g., average current, pulsed current duty cycle, etc.) and/or circuit configurations (e.g., type of regulators, sources, load, pump capacitors), with the determining of the desired capacitance being based on prior simulation or measurement or based on a mechanism that adjusts the capacitance, for instance, in a feedback arrangement. In addition, other forms of compensation circuits, for example, introducing inductance on the output path, networks of elements (e.g., capacitors, inductors).

Note that the description focuses on a specific example of a charge pump. Many other configurations of charge pumps, including Dickson pumps with additional stages or parallel phases, and other configurations of charge pumps (e.g., series-parallel), can be controlled according to the same approach. In addition, the peripherals at the high and/or low voltage terminals are not necessarily regulators, or necessarily maintain substantially constant current. Furthermore, the approaches described are applicable to configurations in which a high voltage supply provides energy to a low voltage load, or in which a low voltage supply provides energy to a high voltage load, or bidirectional configurations in which energy may flow in either direction between the high and the low voltage terminal of the charge pump. It should also be understood that the switching elements can be implemented in a variety of ways, including using Field Effect Transistors (FETs) or diodes, and the capacitors may be integrated into a monolithic device with the switch elements and/or may be external using discrete components. Similarly, at least some of the regulator circuit may in some examples be integrated with some or all of the charge pump in an integrated device.

Implementations of the approaches described above may be integrated into an integrated circuit that includes the switching transistors of the charge pump, either with discrete/off-chip capacitors or integrated capacitors. In other implementations, the controller that determines the switching frequency of the charge pump and/or the compensation circuit may be implemented in a different device than the charge pump. The controller can use application specific circuitry, a programmable processor/controller, or both. In the programmable case, the implementation may include software, stored in a tangible machined readable medium (e.g., ROM, etc.) that includes instructions for implementing the control procedures described above.

It is to be understood that the foregoing description is intended to illustrate and not to limit the scope of the invention, which is defined by the scope of the appended claims. Other embodiments are within the scope of the following claims.

What is claimed is:

1. An apparatus comprising a switched-capacitor charge pump configured to provide voltage conversion between first and second terminals thereof, a compensation circuit coupled to a first terminal of said charge pump, said compensation circuit having a first configuration and a second configuration, wherein, in said first configuration, said first terminal of said charge pump couples to a capacitance, wherein, in said second configuration, said capacitance is decoupled from said first terminal of said charge pump, and a controller coupled to said charge pump and said compensation circuit, said controller comprising an output for configuring said compensation circuit, and a first sensor input for accepting a first sensor-signal that, at least in part, characterizes operation of a circuit selected from the group consisting of said charge pump and a peripheral circuit directly coupled to said charge pump, wherein said controller is configured to configure said compensation circuit based at least in part on said first sensor-signal to promote efficiency of power conversion between a power source coupled to said charge pump and a load coupled to said charge pump via said compensation circuit.

2. The apparatus of claim 1, wherein said first sensor-signal characterizes a voltage at said peripheral circuit.

3. The apparatus of claim 1, wherein said charge pump comprises a capacitor, and wherein said first sensor-signal characterizes a voltage across said capacitor.

4. The apparatus of claim 1, wherein at least some current that passes from said charge pump to said compensation circuit continues through to an inductor in said peripheral circuit.

5. The apparatus of claim 1, wherein said controller comprises a second sensor input for accepting a second sensor-signal that, at least in part, characterizes operation of said circuit.

6. The apparatus of claim 1, wherein said controller is configured to determine an operating mode at least in part based on said first sensor-signal, and to determine said configuration of said compensation circuit according to said determined mode.

7. The apparatus of claim 1, wherein said first sensor-signal characterizes a voltage at said first terminal.

8. The apparatus of claim 1, wherein said controller is configured to couple said first terminal to said capacitance at times that optimize power-conversion efficiency.

9. The apparatus of claim 1, wherein said first sensor-signal characterizes said switching frequency of said charge pump.

10. The apparatus of claim 1, wherein said first sensor-signal characterizes a voltage at said second terminal.

11. The apparatus of claim 1, wherein said charge pump comprises a series-parallel charge pump.

12. The apparatus of claim 1, wherein said first sensor-signal characterizes a duty cycle of a pulsed current passing to or from said charge pump.

13. The apparatus of claim 1, wherein said first sensor-signal characterizes an average of a current passing to said charge pump.

14. The apparatus of claim 1, wherein said peripheral circuit comprises an inductor that is coupled to said compensation circuit.

15. The apparatus of claim 1, wherein said peripheral circuit is coupled between said compensation circuit and said first terminal and wherein said peripheral circuit comprises an inductor, switches, and an output capacitor, wherein control of said switches of said peripheral circuit adjusts a voltage across said output capacitor.

16. The apparatus of claim 1, wherein said peripheral circuit, which is coupled to said compensation circuit, comprises a switch that alternates between being open and being closed, wherein adjustment of a fraction of time during which said switch is closed.

17. The apparatus of claim 1, wherein said peripheral circuit is coupled between said compensation circuit and one of said first and second terminals and wherein said peripheral circuit comprises an inductor that is selectively connected to and disconnected from said compensation circuit.

18. The apparatus of claim 1, further comprising a regulator, wherein said regulator is coupled to said compensation circuit.

19. The apparatus of claim 1, wherein said compensation circuit is coupled to a regulator that achieves a selected output voltage by adjustment of a duty cycle thereof.

20. The apparatus of claim 1, further comprising a regulator, wherein said regulator is coupled between said compensation circuit and said high-voltage terminal.

21. The apparatus of claim 1, further comprising a regulator, wherein said regulator is coupled between said compensation circuit and said low-voltage terminal.

22. A method comprising carrying out voltage conversion, wherein carrying out voltage conversion comprises receiving a sensor signal that characterizes, at least in part, operation of a circuit that is selected from the group consisting of a switched-capacitor charge pump that provides voltage conversion between first and second terminals thereof and a peripheral circuit, wherein said peripheral circuit is directly connected to said switched capacitor charge pump, and based at least in part on said sensor signal, causing a compensation circuit that is coupled to a first terminal of said charge pump to transition between coupling and decoupling a capacitance from said first terminal, and wherein causing said compensating circuit to transition comprises causing said compensation circuit to transition at times that promote efficiency of power conversion between a power source coupled to said charge pump and a load coupled to said charge pump via said compensation circuit.

23. An apparatus comprising a power converter, said power converter comprising first and second terminals, said power converter being configured to cause a second voltage to be maintained at said second terminal in response to presence of a first voltage presented at said first terminal, wherein said power converter further comprises a compensation circuit, a controller, a switching network, and capacitors, wherein said switching network interconnects said capacitors, wherein, as a result of transitioning between first and second states thereof, said switching network causes said capacitors to transition between corresponding first and second arrangements, wherein as a result of a transition, electrical charge propagates between said capacitors, wherein said controller is connected to receive, from at least one of a first circuit and a second circuit, information indicative of an extent to which said propagation of said electrical charge between said capacitors results in energy loss, wherein said controller is configured to cause said compensation circuit to transition between a first configuration and a second configuration based on said information, said transition being one that reduces said extent and that causes a capacitance of said compensation circuit to be switched into or out of communication with said first circuit, wherein said first circuit is a circuit that is formed by said switching network and said capacitors, and wherein said second circuit is a circuit that is directly connected to a circuit that is formed by said capacitors and said switching network.

24. The apparatus of claim 23, wherein said second circuit comprises an inductor.

* * * * *